(12) United States Patent
Yoneda

(10) Patent No.: US 7,050,693 B2
(45) Date of Patent: May 23, 2006

(54) OPTICAL FIBER HOLDER AND OPTICAL FIBER HOLDING METHOD

(75) Inventor: Kenji Yoneda, Kyoto (JP)

(73) Assignee: CCS, Inc., Kyoto (JP)

( * ) Notice: Subject to any disclaimer, the term of this patent is extended or adjusted under 35 U.S.C. 154(b) by 0 days.

(21) Appl. No.: 10/616,627

(22) Filed: Jul. 10, 2003

(65) Prior Publication Data

US 2004/0105649 A1   Jun. 3, 2004

(30) Foreign Application Priority Data

Jul. 12, 2002   (JP)   ............... P2002-204880

(51) Int. Cl.
*G02B 6/00* (2006.01)

(52) U.S. Cl. .................................. 385/137

(58) Field of Classification Search ............... 385/100, 385/101, 76, 135, 98–99, 86, 137
See application file for complete search history.

(56) References Cited

U.S. PATENT DOCUMENTS

| | | |
|---|---|---|
| 4,127,319 A | 11/1978 | Forney, Jr. et al. |
| 4,133,601 A | 1/1979 | Le Guen et al. |
| 4,310,209 A * | 1/1982 | Fleming et al. ............ 439/99 |
| 4,372,792 A * | 2/1983 | Dey et al. .................. 156/48 |
| 4,482,201 A | 11/1984 | Dousset |
| 4,724,024 A * | 2/1988 | Van Der Velde et al. ... 156/181 |
| 4,878,733 A * | 11/1989 | Winter et al. .............. 385/102 |
| 5,024,503 A * | 6/1991 | Gunn et al. ................ 385/53 |
| 5,440,665 A * | 8/1995 | Ray et al. .................. 385/135 |
| 5,491,766 A * | 2/1996 | Huynh et al. .............. 385/100 |
| 5,598,500 A * | 1/1997 | Crespel et al. ............. 385/139 |
| 5,803,575 A | 9/1998 | Ansems et al. |
| 6,101,703 A | 8/2000 | Odanaka |
| 6,507,693 B1 * | 1/2003 | Maron et al. .............. 385/137 |
| 6,538,729 B1 | 3/2003 | Yoneda |

FOREIGN PATENT DOCUMENTS

| | | |
|---|---|---|
| GB | 1 598 598 A | 9/1981 |
| GB | 2 191 873 A | 12/1987 |
| JP | 60134210 | 7/1985 |

* cited by examiner

*Primary Examiner*—J. F. Duverne

(57) ABSTRACT

An improved optical fiber holder is provided, including: a tubular member (3) for fitting over an optical fiber bundle (1) consisting of a bundle of plural optical fibers (11) to prevent the optical fibers (11) from separating from each other; and a pressing structure (5) for exerting a pressing force on the optical fiber bundle (1) in a direction perpendicular to a longitudinal direction of the optical fiber bundle (1) to press the optical fiber bundle (1) against an inner periphery (3a) of the tubular member (3).

18 Claims, 8 Drawing Sheets

OPTICAL FIBER HOLDER AND OPTICAL FIBER HOLDING METHOD

BACKGROUND OF THE INVENTION

1. Field of the Invention

The present invention relates to a device and method for holding a plurality of optical fibers in a bundled state.

2. Description of the Related Art

One prior art device for holding a bundle of plural optical fibers has a bore extending through a member such as a connector for holding a bundle of optical fibers bonded and fixed to each other with adhesive applied to a portion of each optical fiber to be bonded to other optical fibers by allowing the bundle to be inserted therethrough.

With such a device, adhesive must be applied to optical fibers one by one and, hence, the operation of forming a single optical fiber bundle is very troublesome and inconvenient. The use of adhesive enables adjacent optical fibers to be fixed to each other relatively tightly in a certain region by virtue of capillarity occurring in clearances defined between optical fibers. The prior art device, however, requires that adhesive be applied to optical fibers one by one as described above, which results in use of a larger amount of adhesive than necessary. Consequently, capillarity occurs in a wider region, causing the flexibility essential to the optical fiber bundle to be impaired, which makes it difficult to suitably apply the optical fiber bundle to different use conditions.

The present invention, which has been made in view of the foregoing problem, intends to provide an optical fiber bolder and an optical fiber holding method, which are capable of ensuring a proper holding state without impairing the flexibility of an optical fiber bundle.

SUMMARY OF THE INVENTION

In accordance with one aspect of the present invention, there is provided an optical fiber holder comprising: a tubular member for fitting over an optical fiber bundle comprising a bundle of plural optical fibers to prevent the optical fibers from separating from each other; and a pressing structure for exerting a pressing force on the optical fiber bundle in a direction perpendicular to a longitudinal direction of the optical fiber bundle to press the optical fiber bundle against an inner periphery of the tubular member.

The optical fiber holder thus constructed does not use adhesive and hence does not allow capillarity to occur in clearances defined between optical fibers as does the prior art. Thus, the optical fiber holder does not impair the flexibility of the optical fiber bundle and hence can be suitably applied to various use conditions. Further, the optical fiber holder is capable of holding plural optical fibers in a bundled state easily and properly by means of the pressing structure. In fusing the leading edge of the optical fiber bundle inserted through the tubular member for the purpose of end face treatment by applying heat and pressure thereto with a hot plate or the like, the optical fiber bundle is likely to escape rearwardly if it is held by the prior art device. The pressing structure employed in the optical fiber holder of the present invention is capable of effectively preventing the optical fiber bundle from escaping rearwardly, thereby allowing the end face treatment of the leading edge of the optical fiber bundle to be achieved easily and assuredly. Thus, the optical fiber holder is convenient for the end face treatment to be achieved.

In a specific embodiment of the optical fiber holder, the pressing structure comprises an aperture extending through a peripheral wall of the tubular member from an outer periphery of the tubular member to the inner periphery of the tubular member, and a pressing member for exerting the pressing force on the optical fiber bundle through the aperture. With such a feature it is possible to press the optical fiber bundle against the inner periphery of the tubular member by means of a very simple structure, thereby to bold the optical fiber bundle in a proper holding state.

For ease of the end face treatment on the leading end side of the optical fiber bundle, it is sufficient for the pressing structure to be spaced a predetermined distance apart from a leading edge of the optical fiber bundle in the longitudinal direction.

If the pressing structure is located inwardly of the outer periphery of the tubular member, the whole optical fiber holder can be rendered compact.

Preferably, the inner periphery of the tubular member comprises a holding portion having a diameter capable of holding the optical fiber bundle relatively tightly, and a larger-diameter portion located closer to a leading edge of the optical fiber bundle than the holding portion and having a larger diameter than the holding portion, the larger-diameter portion being configured to fit around a fused leading end portion of the optical fiber bundle inserted through the tubular member. This feature allows an end face treatment of the optical fiber bundle to be achieved easily and reliably without any inconvenience which is likely in grinding the leading end face of the optical fiber bundle, such as deterioration in light transmissivity due to adherence of grinding dust or the like to the end face or an uneven surface state resulting from grinding, thus ensuring enhanced light transmissivity. In addition, even when a force works on the optical fiber bundle in such a direction as to draw it out rearwardly, the fused portion of the optical fiber bundle fitted in the larger-diameter portion functions as a stopper which prevents the optical fiber bundle from coming out of the tubular member and, hence, the optical fiber bundle can be reliably held in the tubular member.

In accordance with another aspect of the present invention, there is provided an optical fiber holder comprising a tubular member for fitting over an optical fiber bundle comprising a bundle of plural optical fibers to prevent the optical fibers from separating from each other, the tubular member defining an aperture extending through a peripheral wall of the tubular member from an outer periphery to an inner periphery of the tubular member. With the holder thus constructed, the aperture allows a predetermined amount of adhesive to be injected into the optical fiber bundle therethrough, thereby fixing the portion of the optical fiber bundle extending within the tubular member relatively tightly. In this case adhesive is injected into the optical fiber bundle having been bundled beforehand and, hence, a smaller amount of adhesive than in the case of application of adhesive to each optical fiber is sufficient, which makes it possible to reduce the region permitting capillarity to occur therein to a minimum. As a result, the portion of the optical fiber bundle extending within the optical fiber holder can be fixed relatively tightly by virtue of adhesive expanded due to capillarity, while the rest of the optical fiber bundle extending outwardly of the holder can be freed from such capillarity. Thus, the flexibility of the optical fiber bundle can be ensured.

In accordance with yet another aspect of the present invention, there is provided an optical fiber holder comprising a tubular member for fitting over an optical fiber bundle comprising a bundle of plural optical fibers to prevent the optical fibers from separating from each other, wherein: the tubular member has an inner periphery comprising a holding portion having a diameter capable of holding the optical fiber bundle relatively tightly, and a larger-diameter portion located closer to a leading edge of the optical fiber bundle than the holding portion and having a larger diameter than the holding portion; and the larger-diameter portion is shaped such that planes tangential to respective of predetermined two points on the larger-diameter portion contain respective opposite components that are symmetric with respect to an axis along which the optical fiber bundle extends through the tubular member. With the holder thus constructed, the optical fiber bundle can be effectively prevented from shifting in the direction in which the optical fiber bundle extends through the tubular member. Thus, the optical fiber bundle can be held reliably by merely fusing the leading edge thereof.

In accordance with still another aspect of the present invention, there is provided a method of holding an optical fiber bundle with adhesive, comprising the steps of inserting the optical fiber bundle comprising a bundle of plural optical fibers through a tubular member having an aperture extending through a peripheral wall thereof from an outer periphery to an inner periphery of the tubular member; injecting a predetermined amount of adhesive into the optical fiber bundle through the aperture to fix and hold the optical fibers relatively tightly. This method is capable of eliminating the time and labor which would otherwise be required to apply adhesive to the optical fibers one by one as well as of properly holding the optical fiber bundle by bonding and fixing the optical fibers to each other and to the tubular member following a very simple procedure. Further, since adhesive is injected into the optical fiber bundle having been bundled beforehand, it is possible to minimize the amount of adhesive to be used, which makes it possible to reduce the region permitting capillarity to occur therein to a minimum. As a result, the portion of the optical fiber bundle extending outwardly of the optical fiber holder can assuredly have sufficient flexibility.

The foregoing and other objects, features and attendant advantages of the present invention will become more apparent from the reading of the following detailed description of the invention in conjunction with the accompanying drawings.

DETAILED DESCRIPTION OF THE PREFERRED EMBODIMENTS

The present invention will now be described in detail with reference to the drawings.

Figure 1:
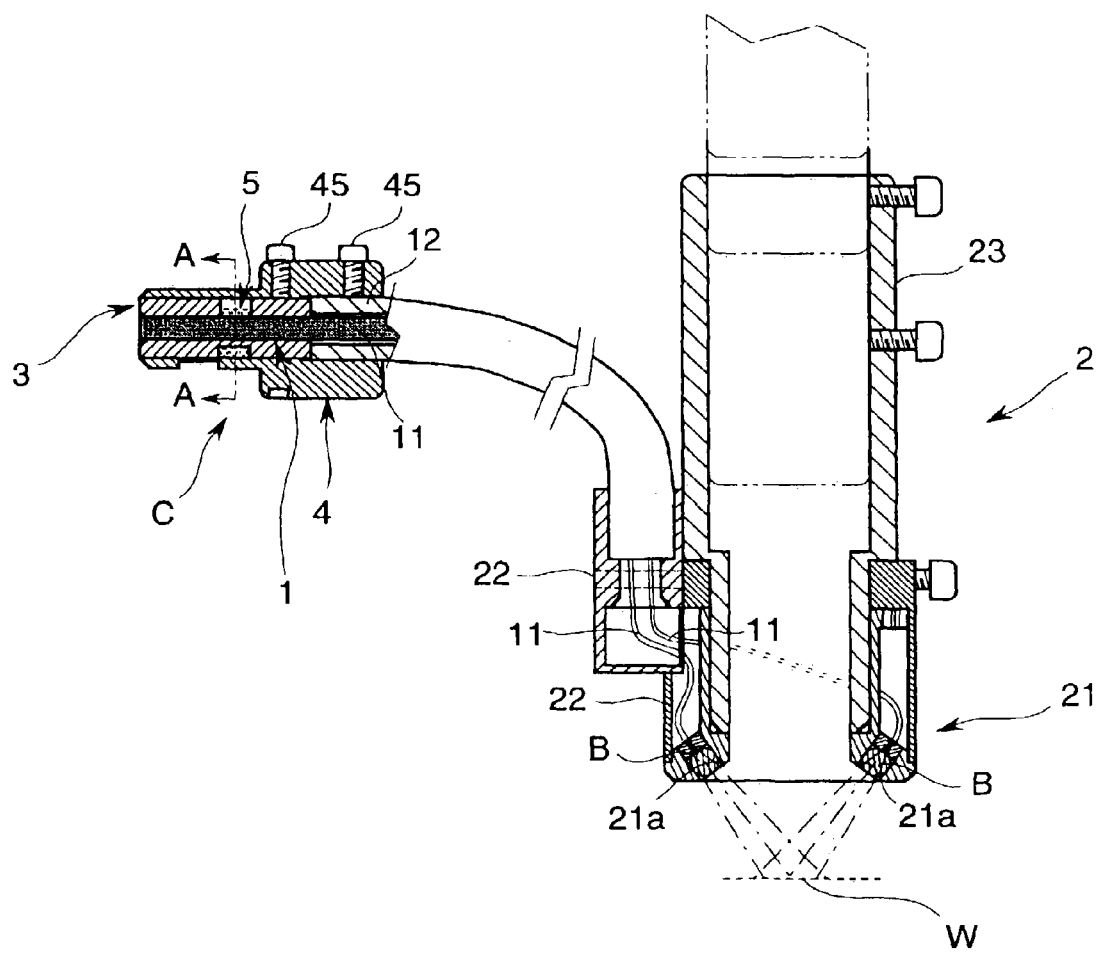
FIG. 1 is a partially enlarged sectional view showing an optical fiber holder comprising a connector according to one embodiment of the present invention.

Referring first to FIG. 1 showing an optical fiber holder C according to one embodiment of the present invention, the optical fiber holder C, which functions, for example, as a connector for holding one end portion of an optical fiber bundle 1, is connected to a head 2.

Figure 2:
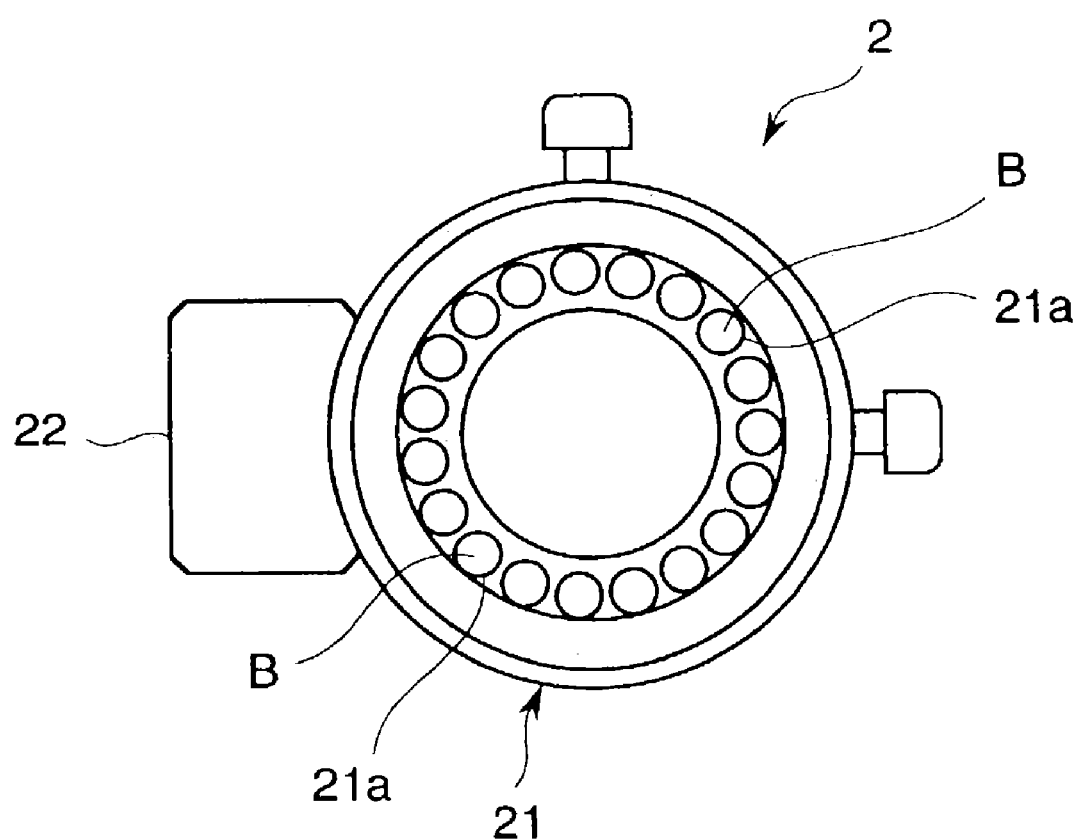
FIG. 2 is a bottom view of a head according to the same embodiment.

The head 2 includes an annular bead body 21, a cover 22 fitting over the head body 21, and a fitting portion 23 capable of adjusting the distance between the head body 21 and a work W to be illuminated, as shown in FIGS. 1 and 2.

The head body 21 is adapted to hold the light-emitting end portions of respective optical fibers 11 as equispaced along the circumference thereof as well as ball lenses B as facing respective light-emitting ends of the optical fibers 11, the optical fibers 11 being branched from the other end of the optical fiber bundle 1. The head body 21 serves to direct light rays emitted from the optical fibers 11 and passed through the ball lenses B toward the work W through an illuminating aperture 21a defined at the lower side of the head body 21.

The cover 22 is adapted to hold the aforesaid other end portion of the optical fiber bundle 1 as well as to cover the optical fibers 11 branched therefrom.

The fitting portion 23 is of a tubular shape and is attached to the side of the head body 21 opposite from the illuminating aperture side.

Figure 3:
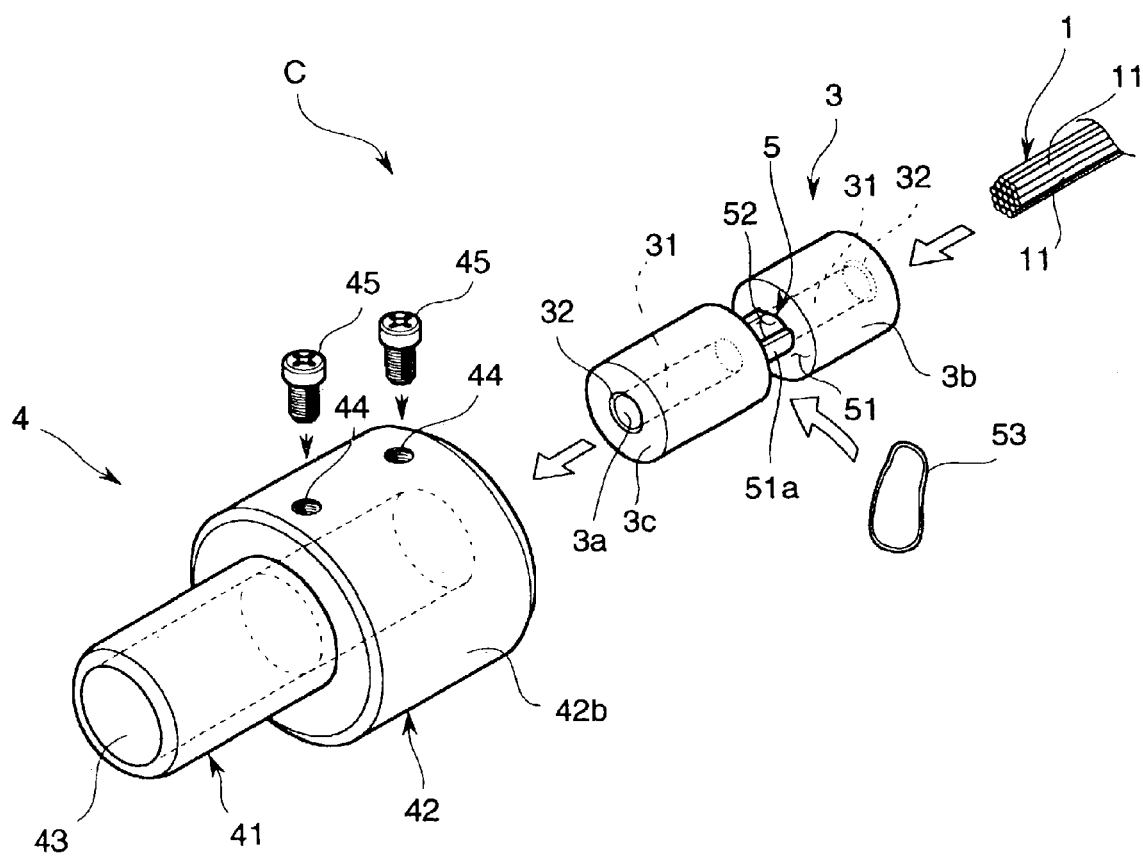
FIG. 3 is an exploded perspective view of the connector according to the same embodiment, with the internal structure thereof partially omitted.
Figure 4:
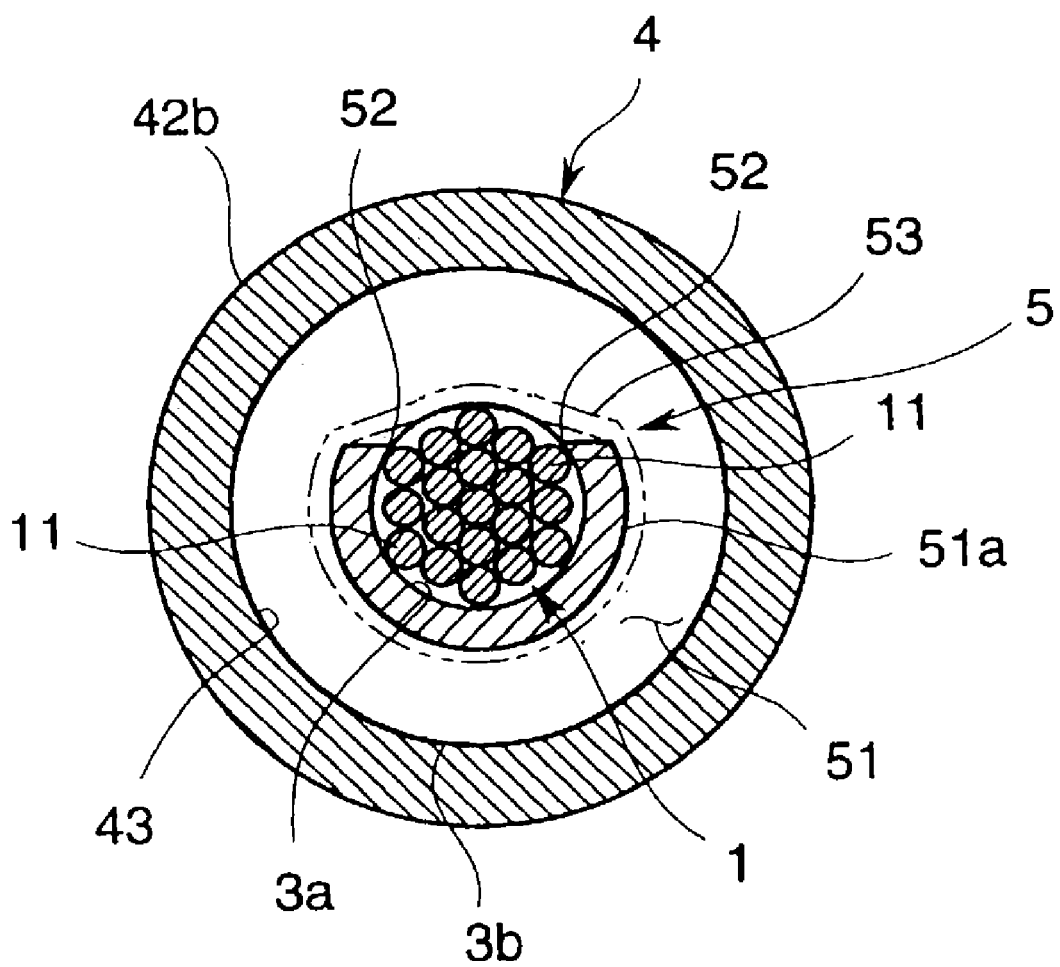
FIG. 4 is a partially omitted sectional view taken on line A—A of FIG. 1.

On the other hand, as shown in FIGS. 1, 3 and 4, the connector C as the optical fiber holder according to this embodiment includes a tubular member 3 fitting over the optical fiber bundle 1 comprising a bundle of the plural optical fibers 11 to prevent the optical fibers 11 from separating from each other, a connector body 4 fitting over the tubular member 3, and a pressing structure 5 for exerting a pressing force on the optical fiber bundle 1 in a direction perpendicular to the longitudinal direction of the optical fiber bundle 1 to press the optical fiber bundle 1 against inner periphery 3a of the tubular member 3.

The tubular member 3 is adapted to hold a light-receiving end portion of the optical fiber bundle 1. The tubular member 3 has an inner periphery formed with a holding portion 31 extending over substantially the entire area of the inner periphery and having a diameter capable of holding the optical fiber bundle 1 relatively tightly and spot-faced portions 32, i.e. larger-diameter portions, at opposite open ends of the tubular member 3, each of the spot-faced portions 32 having a gradually increasing diameter as it extends toward a corresponding end face. The tubular member 3 is further formed with a groove 51 located intermediate the opposite longitudinal ends thereof. The portion of the optical fiber bundle 1 extending from the tubular member 3 is covered with a sheath member 12.

The connector body 4 is shaped into a stepped cylinder, comprising a tip portion 41 and a base end portion 42 having a larger diameter than the tip portion 41. The connector body 4 has a greater longitudinal dimension than the tubular member 3 and defines a longitudinally extending bore 43 having a diameter substantially equal to the outer diameter of the tubular member 3 to receive the tubular member 3 therein longitudinally. The base end portion 42 defines threaded holes 44 extending from an outer peripheral surface 42a to the bore 43 for thread engagement with respective setscrews 45, each of which fastens and fixes the connector body 4 and the tubular member 3 or the portion of the optical fiber bundle 1 extending from the tubular member 3 to each other.

The pressing structure 5 comprises groove 51 extending circumferentially in a substantially longitudinally central portion of the tubular member 3, an aperture 52 formed by opening a portion of a bottom surface 51a of the groove 51, and a rubber band 53 serving as a pressing member. The pressing structure 5 is adapted to exert a pressing force on the optical fiber bundle 1 in a direction perpendicular to the longitudinal direction of the optical fiber bundle 1 by means of the rubber band 53 wrapping around the tubular member 3 by utilizing the groove 51 and aperture 52. The aperture 52 has an open area determined to expose about a quarter of the circumference of the optical fiber bundle 1 on the upper side when the optical fiber bundle 1 is in a state inserted through the tubular body 3, as shown in FIG. 4. The aperture 52 extends through the peripheral wall of the tubular member 3 from outer periphery 3b thereof to the inner periphery 3a thereof. The rubber band 53 has certain resilience and strength and a predetermined thickness like a commercially-available one. The rubber band 53 wrapping around the tubular member 3 by utilizing the groove 51 and aperture 52 is positioned inwardly of the outer periphery 3b of the tubular member 3.

Figure 5:
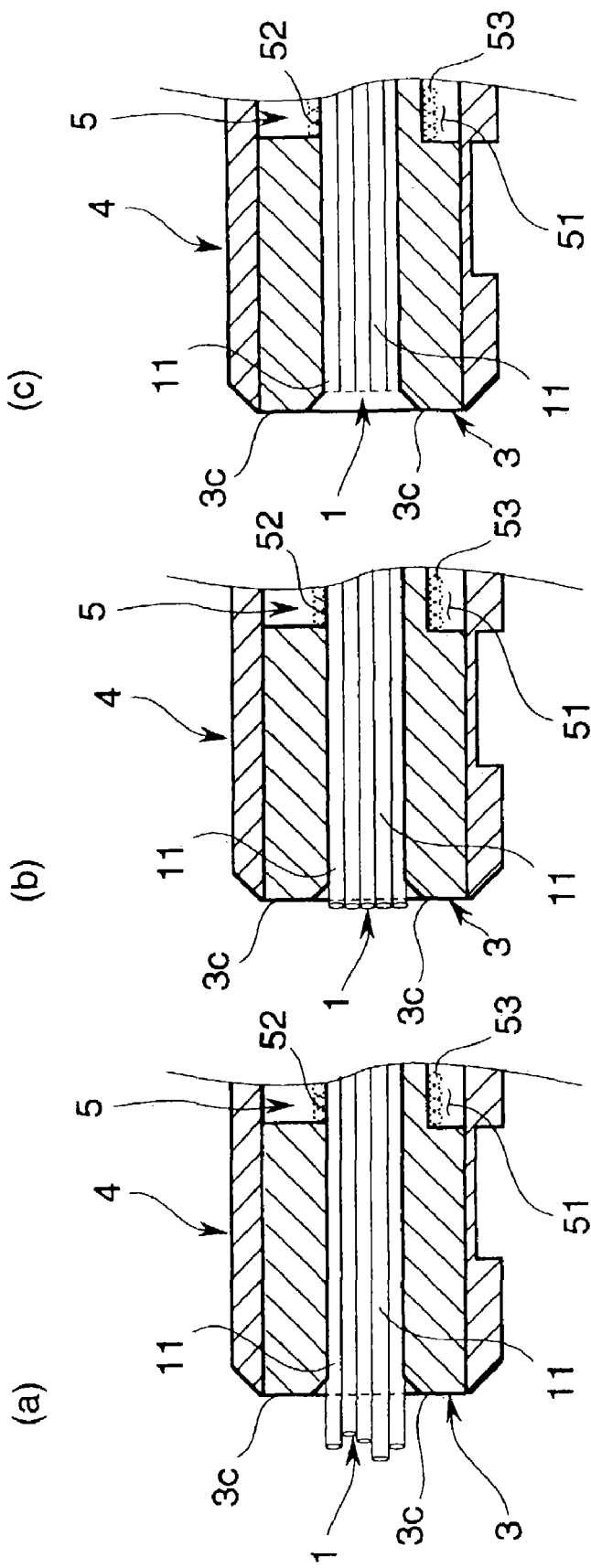
FIGS. 5(a) to 5(c) are fragmentary sectional views schematically illustrating one process of an optical fiber holding method according to the same embodiment.

The following description is directed to a method of holding the optical fiber bundle 1 with use of the connector C comprising the members described above with reference to FIGS. 3 to 5.

First, as shown in FIG. 3, the optical fiber bundle 1 previously formed by bundling plural optical fibers 11 is inserted into the tubular member 3 from the base end side so that the leading end portion of the optical fiber bundle 1 projects forwardly from front face 3c of the tubular member 3 (refer to FIG. 5(a)). By wrapping the tubular member 3 with at least one rubber band 53 depicted by the dashed double dotted line in FIG. 4 so as to cover the portion of the optical fiber bundle 1 exposed upward in the aperture 52 and the groove 51, a pressing force working in a direction perpendicular to the longitudinal direction of the optical fiber bundle 1 is generated, which presses the optical fiber bundle 1 against the inner periphery 3a of the tubular member 3 strongly. Subsequently, the leading end portion of the optical fiber bundle 1 is cut off substantially along the front face 3c of the tubular member 3, as shown in FIG. 5(b). Then, a hot plate (not shown) or analog is pressed against the cut edge of the optical fiber bundle 1 until it becomes abutted to the front face 3c of the tubular member 3, thereby fusing the leading end portion of the optical fiber bundle 1 into a glassy surface flush with the front face 3c of the tubular member 3, as shown in FIG. 5(c). In this case the leading end portion of the optical fiber bundle 1 is thermally deformed and fused in the spot-faced portion 32. After removal of the rubber band 53 the optical fiber bundle 1 is finally fixed by injecting a minimal amount of adhesive required to serve the purpose into the tubular member 3 through the aperture 52. The tubular member 3 in which the optical fiber bundle 1 is thus held by such a simple process is inserted into the bore 41 of the connector body 4 from the base end portion 42 side, and then the two setscrews 45 are screwed into respective threaded holes 45 of the connector body 4 to join the connector body 4 with the tubular member 3 and with the portion of the optical fiber bundle 1 extending from the tubular member 3.

As described above, this embodiment comprises the tubular member 3 for fitting over the optical fiber bundle 1 to prevent optical fibers 11 thereof from separating from each other, and the pressing structure 5 for exerting a pressing force on the optical fiber bundle 1 in a direction perpendicular to the longitudinal direction of the optical fiber bundle 1 to press the optical fiber bundle 1 against the inner periphery 3a of the tubular member 3. By utilizing the pressing structure 5 this embodiment is capable of holding the optical fiber bundle 1 firmly. With this embodiment it is possible to minimize the amount of adhesive to be used and, hence, the region permitting adhesive to expand therein due to capillarity can be reduced to a minimum. As a result, the leading end portion of the optical fiber bundle 1 fitted in the tubular body 3 is fixed to the tubular member 3, while the portion of the optical fiber bundle 1 extending from the connector C does not permit adhesive to infiltrate thereinto and hence maintains sufficient flexibility. The optical fiber bundle 1 thus held by the connector C offers improved ease of use. Though hard pressing of a hot plate against the optical fiber bundle 1 urges the optical fiber bundle 1 to escape rearwardly, the pressing structure 5 strongly pressing the optical fiber bundle 1 against the tubular member 3 can prevent the optical fiber bundle 1 from escaping rearwardly.

Particularly, since the pressing structure 5 comprises the aperture 52 extending through the peripheral wall of the tubular member 3 from the outer periphery 3b thereof to the inner periphery 3a thereof, and the rubber band 53 exerting a pressing force on the optical fiber bundle 1 through the aperture 52, the optical fiber bundle 1 can be pressed against the inner periphery 3a of the tubular member 3 by such a very simple structure.

Since the pressing structure 5 is located inwardly of the outer periphery 3b of the tubular member 3b, the whole connector C can be rendered compact.

Further, this embodiment has the feature that the inner periphery of the tubular member 3 comprises the holding portion 31 having a diameter capable of holding the optical fiber bundle 1 relatively tightly, and the spot-faced portion 32 located on the front end side of the tubular member 3 and having a larger diameter than the holding portion 31. With such a feature, when the leading end portion of the optical fiber bundle 1 is fused, the fused leading end portion of the optical fiber bundle 1 flows into the spot-faced portion 32, whereby the optical fiber bundle 1 can effectively be prevented from coming out of the tubular member 3 rearwardly. In addition, the optical fibers of the optical fiber bundle 1 are joined together by fusion and, hence, the optical fiber bundle 1 can be held in a more unified state.

Moreover, since the leading end portion of the optical fiber bundle 1 is fused into a glassy surface, the end face treatment of the optical fiber bundle 1 can be achieved easily and reliably without any inconvenience which would be likely in grinding the leading end face of the optical fiber bundle 1, such as deterioration in light transmissivity due to adherence of grinding dust or the like to the end face or an uneven surface state resulting from grinding, thus ensuring enhanced light transmissivity.

It should be noted that there is no particular limitation on the specific feature of each part of the foregoing embodiment. For example, the rubber band 53 need not necessarily be removed and may be left as wrapping the tubular member 3. The rubber band 53 thus left as wrapping the tubular member 3 can keep on strongly pressing the optical fiber bundle 1 against the inner periphery 3a of the tubular member 3 with a pressing force as large as that described above, thus eliminating the need for adhesive. Consequently, the optical fiber bundle 1 is freed from the occurrence of capillarity in fine clearances between adjacent optical fibers and, hence, the optical fiber bundle 1 can be used advantageously without impairment of its flexibility.

Variations of this embodiment include a method of holding the optical fiber bundle 1 by fixing the optical fiber bundle 1 to the inside of the tubular member 3 with adhesive and without utilizing the rubber band 53. Specifically, the method includes inserting the optical fiber bundle 1 into the tubular member 3, and injecting a predetermined amount of adhesive through the aperture 52 to fix optical fibers 11 of the bundle 1 to each other and to the tubular member 3 by utilizing capillarity.

With such a method it is possible to fixedly bond the optical fibers 11 to each other and to the tubular member 3 by a very simple process as described above, thereby to hold the optical fiber bundle 1 properly. Since adhesive is injected into the optical fiber bundle 1 previously formed by bundling the plural optical fibers 11, the amount of adhesive to be used can be minimized, which makes it possible to reduce the region permitting capillarity to occur therein to a minimum. As a result, the leading end portion of the optical fiber bundle 1 fitted in the tubular member 3 is fixed, while the portion of the optical fiber bundle 1 extending from the connector C, which is not fixed tightly, can maintain sufficient flexibility. Like the foregoing embodiment this variation may further include the steps of: cutting off the leading end portion of the optical fiber bundle 1 substantially along the front face 3c of the tubular member 3; and pressing a hot plate (not shown) or analog against the cut edge of the optical fiber bundle 1 to fuse the leading end portion of the optical fiber bundle 1. To realize a more preferable holding state relatively easily, this method may be varied to include: temporarily holding the optical fiber bundle 1 in the tubular member 3 with use of rubber band 53; heat-fusing the leading end portion of the optical fiber bundle 1 as temporarily held; and injecting adhesive into the optical fiber bundle 1 after removal of the rubber band 53.

Figure 6:
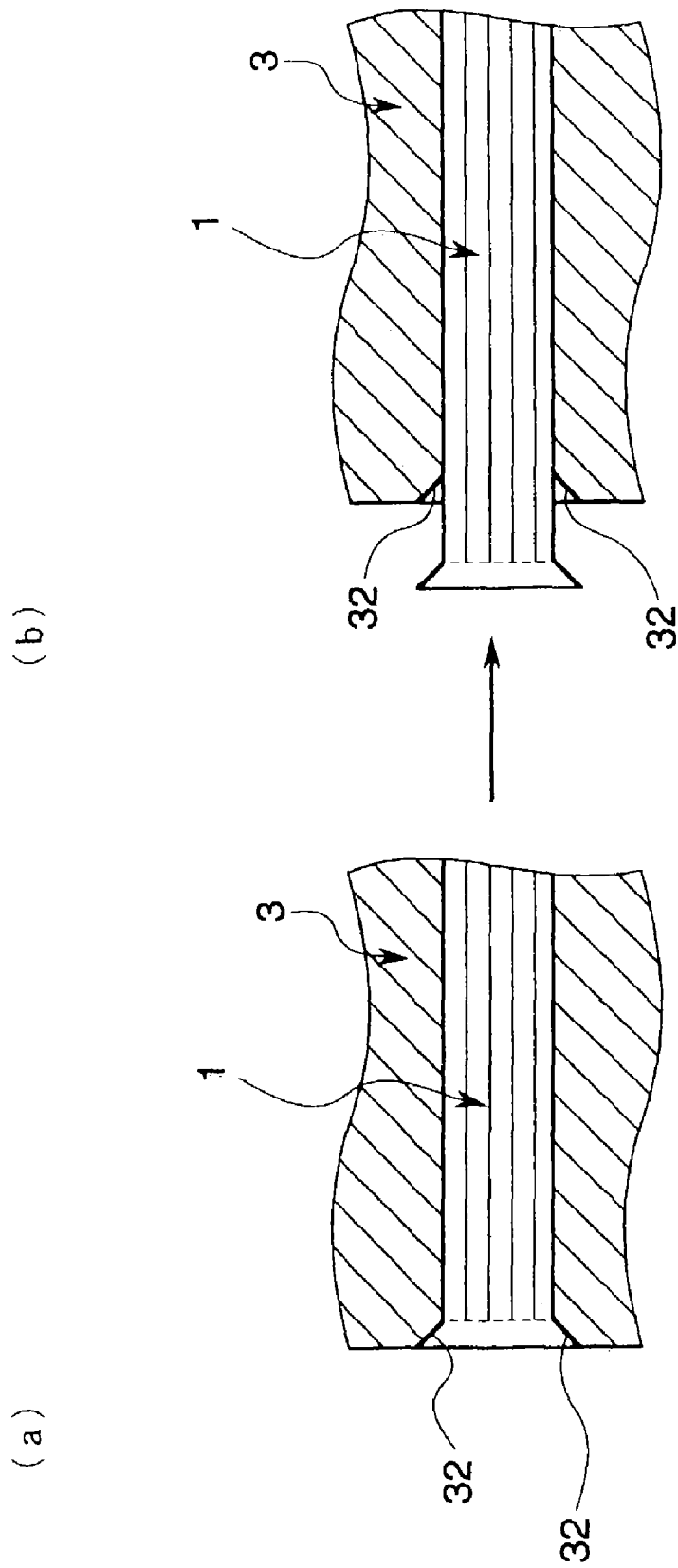
FIGS. 6(a) and 6(b) are partially enlarged fragmentary sectional views showing a variation of the present invention.

Alternatively, the optical fiber bundle 1 may be held in the tubular member 3 by: protruding the fused leading end portion of the optical fiber bundle 1 forwardly (refer to FIGS. 6(a) and 6(b); pouring a minimum amount of adhesive into the spot-faced portion 32; and fitting the fused portion of the optical fiber bundle 1 into the spot-faced portion 32. Such a process allows the end face treatment of the leading end portion of the optical fiber bundle 1 easily and reliably thereby ensuring the optical fiber bundle 1 having enhanced light transmissivity. Further, even if a force works on the optical fiber bundle 1 toward a direction such as to draw it out of the tubular member 3 rearwardly, the fused portion of the optical fiber bundle 1 functions as a stopper for preventing the optical fiber bundle 1 from coming out of the tubular member 3, whereby the optical fiber bundle 1 can be held in the tubular member 3 reliably.

Figure 7:
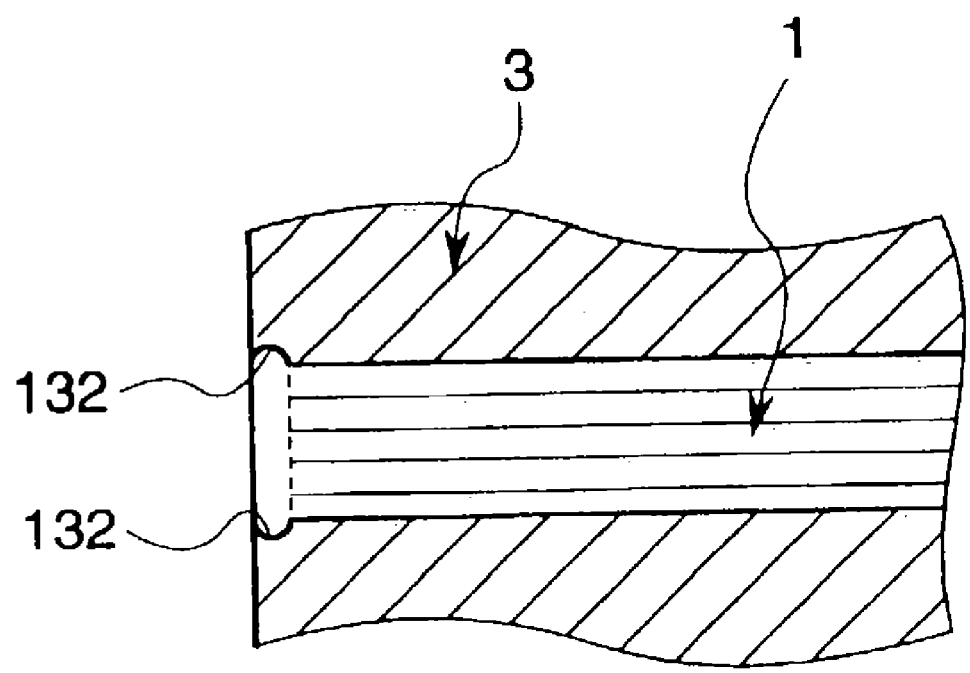
FIG. 7 is a partially enlarged fragmentary sectional view showing a variation of the present invention.

If the larger-diameter portion 132 of the tubular member 3 is shaped such that planes tangential to respective of predetermined two points on the surface of the larger-diameter portion 132 contain respective opposite components that are symmetric with respect to the axis along which the optical fiber bundle 1 extends through the tubular member 3, as shown in FIG. 7, it is possible to effectively prevent the optical fiber bundle 1 from shifting in the direction in which the optical fiber bundle 1 extends in the tubular member 3. Thus, it is possible to hold the optical fiber bundle 1 by merely fusing the leading end portion thereof.

Figure 8:
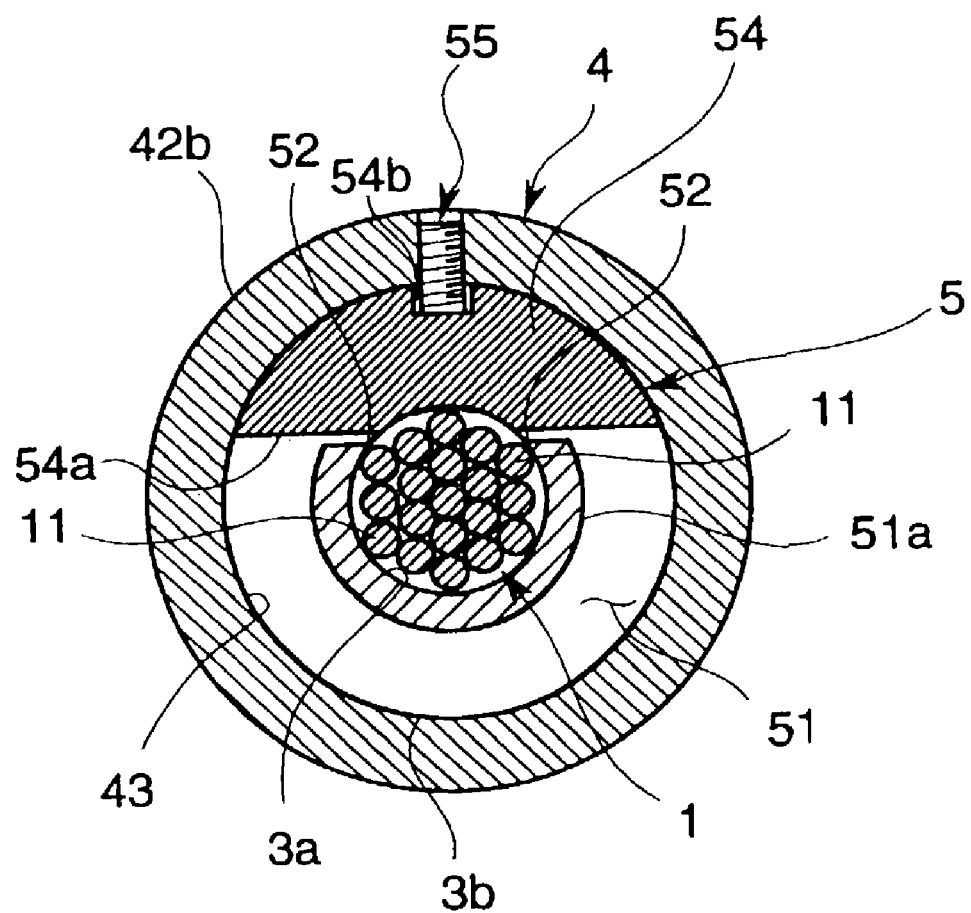
FIG. 8 is a partially enlarged fragmentary sectional view showing a variation of the present invention.

A pressing member as shown in FIG. 8 may be used. This pressing member 54 is shaped substantially semicylindrical and adapted to press a peripheral surface of the optical fiber bundle 1 fitted and exposed in the aperture 52. Specifically, the pressing member 54 has a setscrew 55 screwed inwardly from the connector body 4 to press against the bottom of a recess 54b defined in an outer peripheral surface of the pressing member 54, thereby exerting a pressing force on the optical fiber bundle 1 to press the optical fiber bundle 1 against the inner periphery 3a of the tubular member 3 strongly. Though hard pressing of a hot plate against the leading edge of the optical fiber bundle 1 in the fusing step urges the optical fiber bundle 1 to escape rearwardly, the pressing member 54 strongly pressing the optical fiber bundle 1 against the tubular member 3 can prevent the optical fiber bundle 1 from escaping rearwardly. It is possible to use the optical fiber holder in a state fitted with the pressing member 54, which can completely dispense with adhesive.

Of course, the aforementioned holding methods may be combined with each other appropriately. The tubular member is not limited to a cylindrical tubular member and may be shaped into a polygonal tube or a tube comprising mating halves which can be joined together so as to fit over the optical fiber bundle. Also, it is possible to employ an arrangement comprising a tubular member having a tapered outer periphery formed with external thread and defining a notch in a portion adjacent the front end thereof, and a connector body defining a bore formed with internal thread corresponding to the external thread, wherein in use the tubular member is threadingly fitted into the connector body to reduce the inner diameter of the tubular member, whereby the two members are firmly joined with each other. On the other hand, the larger-diameter portion may be a recess having a larger diameter than the holding portion instead of the spot-faced portion. Such a recess can produce the same effect as in the foregoing embodiment. Instead of the rubber band, it is possible to use a string, a so-called tying band capable of adjusting the diameter thereof by inserting one end thereof into a hole defined at the other end thereof, or an analog.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. An optical fiber holder comprising: a tubular member fitting over and adjacent a light receiving end portion of an optical fiber bundle comprising a bundle of plural optical fibers to prevent the light receiving end portion of optical fibers from separating from each other; and a pressing structure exerting a pressing force on the optical fiber bundle in a direction perpendicular to a longitudinal direction of the optical fiber bundle to press the optical fiber bundle against an inner periphery of the tubular member, the pressing structure comprises an aperture extending through a peripheral wall of the tubular member from an outer periphery of the tubular member to the inner periphery of the tubular member, and a pressing member exerting the pressing force on the optical fiber bundle through the aperture.

2. The optical fiber holder in accordance with claim 1, wherein the pressing structure is spaced a predetermined distance apart from a leading edge of the optical fiber bundle in the longitudinal direction.

3. The optical fiber holder in accordance with claim 1, wherein the pressing structure is located inwardly of the outer periphery of the tubular member.

4. An optical fiber holder comprising a tubular member fitting over and adjacent a light receiving portion of an optical fiber bundle comprising a bundle of plural optical fibers to prevent the light receiving end portion of the optical fibers from separating from each other, the tubular member defining an aperture extending through a peripheral wall of the tubular member from an outer periphery to an inner periphery of the tubular member.

5. An optical fiber holder comprising a tubular member fitting over an optical fiber bundle comprising a bundle of plural optical fibers to prevent the optical fibers from separating from eaeh other, wherein: the tubular member has an inner periphery comprising a holding portion having a diameter holding the optical fiber bundle relatively tightly, and a larger-diameter portion located closer to a leading edge of the optical fiber bundle than the holding portion and having a larger diameter than the holding portion; and the larger-diameter portion is shaped such that planes tangential to respective of predetermined two points on the larger-diameter portion contain respective opposite components that are symmetric with respect to an axis along which the optical fiber bundle extends through the tubular member.

6. An optical fiber bundle holder comprising:
 a connector unit having a bore extending there through;
 a tubular member of a dimension to be received and secured within the connector unit bore, the tubular member has a conduit receiving an optical fiber bundle;
 a pressing member exerting a compressive force on the optical fiber bundle, the tubular member having an intermediate groove between opposite longitudinal ends of the tubular member communicating with the bore and to enable a portion of the optical fiber to extend within the groove whereby a contact of the pressing member occurs in the groove with the optical fiber bundle; and
 a member securing the tubular member within the connector unit wherein the pressing member exerts a compressive force traverse to a longitudinal direction of the optical fiber bundle for restraining relative movement of the optical fiber bundle.

7. The optical fiber bundle holder of claim 6 wherein the pressing member is a resilient encircling band member that contracts against the optical fiber bundle when released within the groove.

8. The optical fiber bundle holder of claim 6 wherein the pressing member includes a semi-cylindrical member and setscrew extending through the connector unit for applying pressure on the semi-cylindrical member.

9. An optical fiber holder assembly comprising:
 a connector body having a first bore extending therethrough
 a tubular member having a second bore extending therethrough, the tubular member has an opening transverse to an axis of the second bore and extending through to the second bore, wherein the first bore is larger than an outer circumference of the tubular member;
 a first fastener on the connector body engaging a first optical fiber bundle mounted in the first bore;
 a second fastener on the connector body engaging the tubular member whereby a communicating alignment is held between the first optical fiber bundle mounted in the first bore and a second optical fiber bundle mounted in the tubular member; and
 holding means inserted within the transverse opening holding the second optical fiber bundle relative to the tubular member.

10. The optical fiber holder assembly of claim 9 wherein the holding means is a fluid adhesive.

11. The optical fiber holder assembly of claim 9 wherein the holding means is a flexible elastic band that is dimensioned to be in a state of tension when encircling the tubular member and extending within the transverse opening to press the second optical fiber against an interior of a portion of the second bore.

12. The optical fiber holder assembly of claim 9 wherein an entrance opening of the tubular second bore is surrounded by a beveled surface on the tubular member.

13. The optical fiber holder assembly of claim 9 wherein the tubular member is bifurcated with a front tubular part and a rear tubular part.

14. An optical fiber holder comprising:
 a tubular member fitting over an optical fiber bundle comprising a bundle of plural optical fibers to prevent the optical fibers from separating from each other; and
 a pressing structure exerting a pressing force on the optical fiber bundle in a direction perpendicular to a longitudinal direction of the optical fiber bundle to press the optical fiber bundle against an inner periphery of the tubular member, wherein the inner periphery of the tubular member comprises a holding portion having a diameter holding the optical fiber bundle relatively tightly, and a larger-diameter portion located closer to a leading edge of the optical fiber bundle than the holding portion and having a larger diameter than the holding portion, the larger-diameter portion being configured to fit around a fused leading end portion of the optical fiber bundle inserted through the tubular member.

15. The optical fiber holder in accordance with claim 14, wherein the pressing structure comprises an aperture extending through a peripheral wall of the tubular member from an outer periphery of the tubular member to the inner periphery of the tubular member, and a pressing member exerting the pressing force on the optical fiber bundle through the aperture.

16. The optical fiber holder in accordance with claim 14, wherein the pressing structure is spaced a predetermined distance apart from a leading edge of the optical fiber bundle in the longitudinal direction.

17. The optical fiber holder in aecordance with claim 14, wherein the pressing structure is located inwardly of the outer periphery of the tubular member.

18. An optical fiber holder comprising:
 a tubular member fitting over and adjacent a light receiving end portion of an optical fiber bundle comprising a bundle of plural optical fibers to prevent the light receiving end portion of optical fibers from separating from each other; and
 a pressing structure located inwardly of the outer periphery of the tubular member, and exerting a pressing force on the optical fiber bundle in a direction perpendicular to a longitudinal direction of the optical fiber bundle to press the optical fiber bundle against an inner periphery of the tubular member.

* * * * *